United States Patent Office 3,816,426
Patented June 11, 1974

3,816,426
1-(5-PHENYL-4-OXO-2-OXAZOLIN-2-YL)
PIPERAZINES
Cheuk Man Lee, Waukegan, Ill., assignor to Abbott Laboratories, North Chicago, Ill.
No Drawing. Continuation-in-part of application Ser. No. 84,481, Oct. 27, 1970, now abandoned. This application July 5, 1972, Ser. No. 268,966
Int. Cl. C07d 51/70
U.S. Cl. 260—268 C                 8 Claims

ABSTRACT OF THE DISCLOSURE

Covers 1 - (5-phenyl-4-oxo-2-oxazolin-2-yl)piperazines which are useful as anti-depressants.

REFERENCE TO RELATED APPLICATIONS

This application is a continuation-in-part of copending application bearing Ser. No. 84,481, filed Oct. 27, 1970, and now abandoned.

BACKGROUND OF THE INVENTION

Patients suffering from depression manifest one or more of a variety of symptoms. Generally speaking, depressed patients feel incapable of dealing with their responsibilities. The predominant symptoms of depression are hypochondria, anoxeria, insomnia, anergia, anagdonia and pessimism. Patients suffering from these symptoms are usually treated with anit-depressants. The present invention provides novel compounds useful as anti-depressant drugs.

BRIEF SUMMARY OF THE INVENTION

The compounds of this invention are represented by the following structural formula:

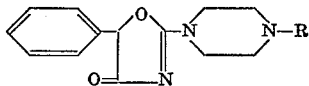

wherein R is selected from the group consisting of lower-alkoxycarbonyl, carbamoyl, lower alkylcarbamoyl, di-lower alkylcarbamoyl, phenylcarbamoyl, chlorophenylcarbamoyl and methoxyphenylcarbamoyl. When R is lower alkoxycarbonyl or lower alkylcarbamoyl, the alkyl group usually contains 1-6 carbon atoms.

DETAILED DESCRIPTION OF THE INVENTION

The compounds of this invention may be prepared via a number of known techniques. By far the simplest procedure involves the reaction of 2-acetamido-5-phenyl-2-oxazolin-4-one with an N-substituted piperazine wherein the substituent on the piperazine may be one of the R-groups listed above. The 2-acetamido-5-phenyl-2-oxazolin-4-one reagent is conveniently prepared according to the method outlined in German Patent 1,237,570.

In an alternate method, 2 - acetamido-5-phenyl-2-oxazolin-4-one is reacted with piperazine. The resultant compound, 1-(5-phenyl-4-oxo-2-oxazolin-2-yl) piperazine may be further reacted in a suitable solvent with a cyanate such as potassium cyanate, an alkyl isocyanate such as methyl isocyanate, a dialkylcarbamoyl halide such as diethylcarbamoyl chloride, or an isocyanate such as phenyl isocyanate, p-chlorophenyl isocyanate or p-methoxyphenyl isocyanate.

The above compounds are particularly useful as anti-depression agents. In addition, they also are useful as tranquilizers and exhibit central nervous system activity.

When used as anti-depressant agents, the compounds here when administered to mammals such as humans are effective in dosage ranges of from about 1 to about 100 mg./kg. of body weight daily, either in single or divided dosages. More often, the daily dosage range is 5–50 mg./kg.

The following examples illustrate typical compounds of this invention and their mode of preparation. It is understood, of course, that these examples are merely illustrative and the invention is not to be limited thereto.

EXAMPLE 1

Preparation of 1-carbethoxy-4-(5-phenyl-4-oxo-oxazolin-2-yl)-piperazine

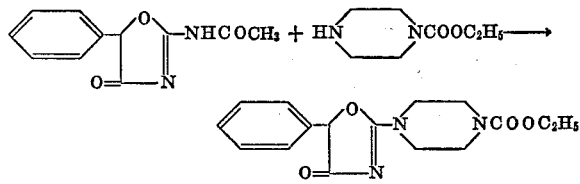

2-acetamido-5-phenyl-2-oxazolin - 4 - one (4.36 g., 0.02 mole) was added to a stirred solution of 9.48 g. (0.06 mole) of ethyl N-piperazinocarboxylate in 200 ml. of 1,4-dioxane. The mixture was stirred at room temperature for 5.5 hours. The mixture was filtered to remove the solid; M.P. 245–248°, 1.0 g. which was identified as 2-amino-5-phenyl-2-oxazolin-4-one. The filtrate was evaporated to dryness in vacuo and the residue was recrystallized from ethanol to yield 2.7 g. of 1-carbethoxy-4-(5-phenyl-4-oxo-2-oxazolin-2-yl)piperazine, melted at 164–165°.

Analysis calculated for $C_{16}H_{19}N_3O_4$: C, 60.56; H, 6.03; N, 13.25. Found: C, 60.75; H, 6.19; N, 13.08.

EXAMPLE 2

Preparation of 1-carbamoyl-4-(5-phenyl-4-oxo-2-oxazolin-2-yl)-piperazine

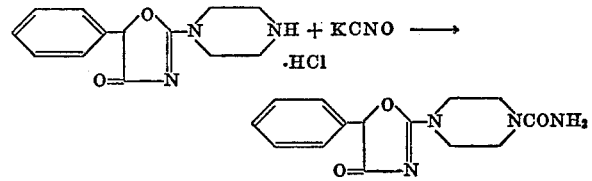

A solution of 1.09 g. of potassium cyanate in 5 ml. of water was added gradually to a stirred solution of 3.77 g. of 1-(5-phenyl-4-oxo-2-oxazolin - 2 - yl)piperazine hydrochloride in 55 ml. of water. The mixture was stirred at room temperature for 1.5 hours. The precipitate was filtered, washed with water, and recrystallized from methanol to yield 2.74 g. of the product, melted at 244–246°.

Analysis calculated for $C_{14}H_{16}N_4O_3$: C, 58.32; H, 5.59; N, 19.44. Found: C, 58.48; H, 5.65; N, 19.63.

EXAMPLE 3

Preparation of 1-(methylcarbamoyl)-4-(5-phenyl-4-oxo-2-oxazolin-2-yl)piperazine

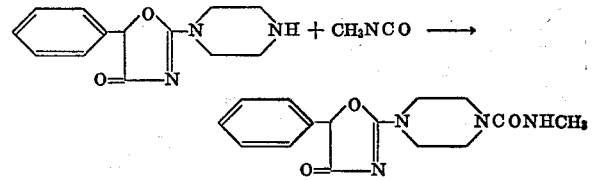

A mixture of 7.35 g. of 1-(5-phenyl-4-oxo-2-oxazolin-2-yl)piperazine, 17 ml. of methyl isocyanate and 50 ml. of dry pyridine was stirred and refluxed for 2.5 hours. The excess methyl isocyanate and pyridine were removed by distillation at reduced pressure and the residue was recrystallized from benzene yielding 4.9 g. of 1-(methylcarbamoyl) - 4 - (5 - phenyl-4-oxo-2-oxazolin-2-yl)piperazine having a melting point of 138–140°. An analytical sample was prepared by drying in vacuo at 108°.

Analysis calculated for $C_{15}H_{18}N_4O_3$: C, 59.59; T, 6.00; N, 18.53. Found: C, 59.71; H, 6.07; N, 18.23.

EXAMPLE 4

Preparation of 1-(diethylcarbamoyl)-4-(5-phenyl-4-oxo-2-oxazolin-2-yl)piperazine

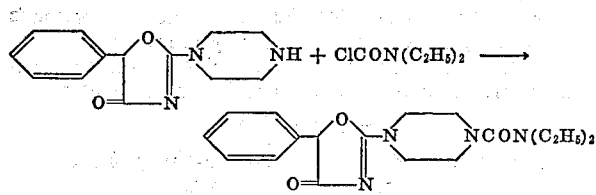

A solution of 4.07 g. of diethylcarbamoyl chloride in 15 ml. of benzene was added dropwise to a stirred, near boiling solution of 7.35 g. of 1-(5-phenyl-4-oxo-2-oxazolin-2-yl)piperazine and 3.34 g. of triethylamine in 250 ml. of benzene. The mixture was refluxed for 1 hour. After cooling, the mixture was filtered and the solid was washed with water. The benzene filtrate was evaporated to dryness in vacuo leaving a solid residue. The combined solid was recrystallized from ethyl acetate yielding 5.6 g. of 1 - (diethylcarbamoyl) - 4 - (5-phenyl-4-oxo-2-oxazolin-2-yl)piperazine having a melting point of 159–160°.

Analysis calculated for $C_{18}H_{24}N_4O_3$: C, 62.77; H, 7.02; N, 16.27. Found: C, 62.99; H, 7.25; N, 16.14.

EXAMPLE 5

Preparation of 1-(phenylcarbamoyl)-4-(5-phenyl-4-oxo-2-oxazolin-2-yl)-piperazine

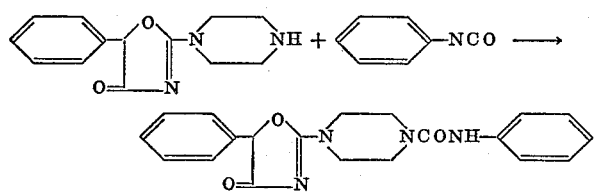

A solution of 2.38 g. of phenyl isocyanate in 5 ml. of 1,4-dioxane was added dropwise to a stirred, hot solution of 4.90 g. of 1-(5-phenyl-4-oxo-2-oxazolin-2-yl)-piperazine in 150 ml. of 1,4-dioxane. The mixture was refluxed with stirring for 1 hour and evaporated to dryness in vacuo. The residue was recrystallized from ethanol yielding 5.1 g. of 1-(phenylcarbamoyl)-4-(5-phenyl-4-oxo-2-oxazolin-2-yl)-piperazine having a melting point of 176–177°.

Analysis calculated for $C_{20}H_{20}N_4O_3$: C, 65.92; H, 5.53; N, 15.37. Found: C, 66.12; H, 5.76; N, 15.32.

EXAMPLE 6

Preparation of 1-(p-chlorophenylcarbamoyl)-4-(5-phenyl-4-oxo-2-oxazolin-2-yl)-piperazine

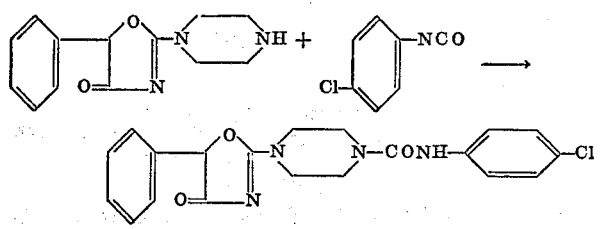

Via the procedure, for Example 5, using p-chlorophenyl isocyanate, 4.2 g. of 1-(p-chlorophenylcarbamoyl)-4-(5-phenyl-4-oxo-2-oxazolin-2-yl)-piperazine having a melting point of 192–193°.

Analysis calculated for $C_{20}H_{19}ClN_4O_3$: C, 60.22; H, 4.80; N, 14.05. Found: C, 60.49; H, 4.86; N, 14.25.

EXAMPLE 7

Preparation of 1-(p-methoxyphenylcarbamoyl)-4-(5-phenyl-4-oxo-2-oxazolin-2-yl)-piperazine

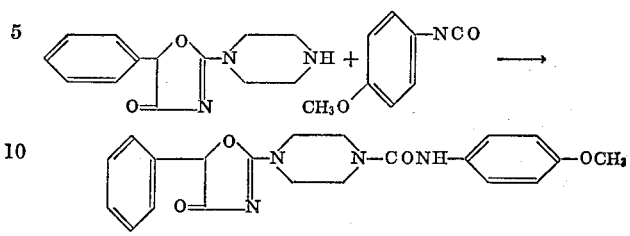

Using p-methoxyphenyl isocyanate, 3.8 g. of 1-(p-methoxyphenylcarbamoyl) - 4-(5 - phenyl - 4 - oxo-2-oxazolin-2-yl)piperazine having a melting point of 205–207° was obtained according to the procedure of Example 5.

Analysis calculated for $C_{21}H_{22}N_4O_4$: C, 63.94; H, 5.62; N, 14.21. Found: C, 63.93; H, 5.68; N, 14.22.

Representative compounds falling within the above general formula were tested in mice for anti-depressant activity utilizing the modified DOPA-test described by G. M. Everett et al., Proc. 1st Int. Symp. Anti-Depressant Drugs, page 164 (1966).

Specifically, the modified DOPA test described by G. M. Everett et al, Proc. 1st. Int. Symp. Anti-Depressant Drugs, page 164 (1966) was utilized. This modified DOPA test is based on the following: When dl-dopa is given to untreated mice, no response occurs because of the inactivation of the DOPA by endogenous monoamine oxidase. However, if mice are pretreated with a monoamine oxidase inhibitor, such as via an oral administration of 40 mg./kg. of pargyline hydrochloride and then given 200 mg./kg. of dl-dopa orally, along with a known anti-depressant drug, the mice show maximum motor reaction, violent activity jumping and fighting. Known anti-depressants such as imipramine and amitryptyline are extremely effective agents in potentiating the DOPA response in mice. Thus, the modified DOPA test has been found to be unusually sensitive and reliable in evaluating the anti-depressant activity of potential drugs.

The compounds from Examples 1–7 were then tested at various dosages using the just described test procedure. The drugs were administered orally. The effectiveness of the drugs was evaluated after 4 hours following administration and giving ratings of 1. Slight activity
2. Moderate activity
3. Marked activity Results are listed in Table I below

TABLE I

| Example No.: | Rating |
|---|---|
| 1 | 2— |
| 2 | 2— |
| 3 | 2 |
| 4 | 1 |
| 5 | 2 |
| 6 | 2 |
| 7 | 1 |

The novel compounds here disclosed can be administered orally or by injection. For the latter, solutions or suspensions may be prepared by slurrying 1–10 percent of the compound in water containing 0.1–2.0 percent of carboxymethyl cellulose; suspensions may also be prepared using 0.05–0.5 percent tragacanth solutions.

For oral administration, tablets, pills and capsules are easily prepared since the new compounds are solids. These compounds also exhibit excellent storage stability, resistance to moisture pickup and the like. Tablets may be prepared to contain between 5 and 25 mg. of the active compound together with the usual tableting adjuvants, e.g. coloring agents, flavoring agents, diluents, lubricants, carriers and, if desired, dispersing agents or release retardants. The compounds may also be combined with other active compounds such as tranquilizers.

What is claimed is:
1. A compound of the formula

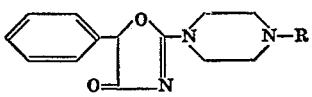

wherein R is selected from the group consisting of lower alkoxycarbonyl, carbamoyl, lower alkylcarbamoyl, di-lower alkylcarbamoyl, phenylcarbamoyl, chlorophenylcarbamoyl and methoxyphenylcarbamoyl with the proviso that when R is lower alkoxycarbonyl, lower alkylcarbamoyl, or di-lower alkylcarbamoyl the alkyl group has 1-6 carbon atoms.

2. The compound of claim 1 wherein R is carbethoxy.
3. The compound of claim 1 wherein R is carbamoyl.
4. The compound of claim 1 wherein R is methylcarbamoyl.
5. The compound of claim 1 wherein R is diethylcarbamoyl.
6. The compound of claim 1 wherein R is phenylcarbamoyl.
7. The compound of claim 1 wherein R is p-chlorophenylcarbamoyl.
8. The compound of claim 1 wherein R is p-methoxyphenylcarbamoyl.

References Cited
UNITED STATES PATENTS

| | | | |
|---|---|---|---|
| 2,519,715 | 8/1950 | Stewart | 260—268 C |
| 2,857,384 | 10/1958 | Druey | 260—268 C |
| 3,029,189 | 10/1962 | Hardy | 260—307 A |
| 3,321,470 | 5/1967 | Howell | 260—268 H |
| 3,557,135 | 1/1971 | Marchetti | 260—268 C |
| 3,567,826 | 3/1971 | Aron-Samuel | 260—268 H |
| 3,578,672 | 5/1971 | Lee | 260—307 A |
| 3,021,333 | 2/1962 | Reesner | 260—268 H |
| 3,321,470 | 5/1967 | Howell | 260—268 H |

OTHER REFERENCES

Howell et al.: Chem. Abstr., vol. 67, col. 90791u (abstract in U.S. 3,313,688).

Lindberg et al.: Chem. Abstr., vol. 69, col. 52050k (1968).

DONALD G. DAUS, Primary Examiner

U.S. Cl. X.R.

260—268 H; 424—250